United States Patent [19]

Curbelo et al.

[11] Patent Number: 4,935,633
[45] Date of Patent: Jun. 19, 1990

[54] LOW POWER INFRARED SOURCE ASSEMBLY FOR SPECTROMETER

[75] Inventors: Raul Curbelo, Lexington; David C. Brown, Cambridge, both of Mass.

[73] Assignee: Bio-Rad Laboratories, Inc., Hercules, Calif.

[21] Appl. No.: 255,690

[22] Filed: Oct. 11, 1988

[51] Int. Cl.⁵ .............................................. H01K 1/02
[52] U.S. Cl. .............................. 250/504 R; 250/493.1; 219/492; 219/553
[58] Field of Search .................... 250/504 R, 493.1; 219/492, 553; 315/105

[56] References Cited

U.S. PATENT DOCUMENTS

| 1,797,205 | 3/1931 | Houck | 315/105 |
| 3,100,828 | 8/1963 | Jacobs et al. | 219/553 |
| 3,394,259 | 7/1968 | Brown | 250/504 |
| 3,949,231 | 4/1976 | Blunck et al. | 250/493.1 |

Primary Examiner—Jack I. Berman
Attorney, Agent, or Firm—Townsend and Townsend

[57] ABSTRACT

An infrared source that operates at about 1150° C. without the need for water cooling. The source is configured with a small surface area radiating element, energized by a high frequency AC square wave. The frequency of the AC square wave is much greater than the inverse of the filament's thermal time constant so that the temperature is very stable. The radiating element is mounted relative to a concave reflector so that the infrared radiation forms a beam suitable for input to a spectrometer. In a first embodiment, the radiating element is in the form of a wire coil, while in a second embodiment, it is in the form of a cylinder having a central portion of reduced diameter.

16 Claims, 2 Drawing Sheets

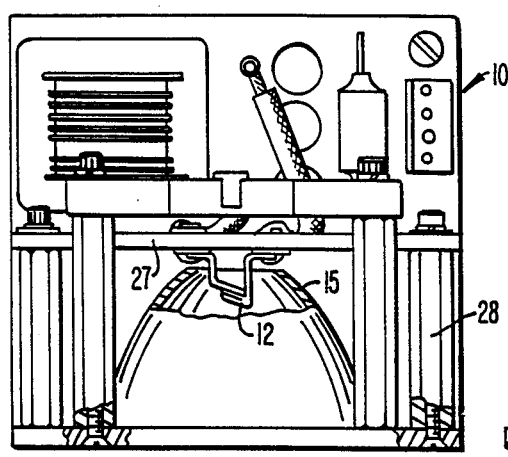
FIG._1A.
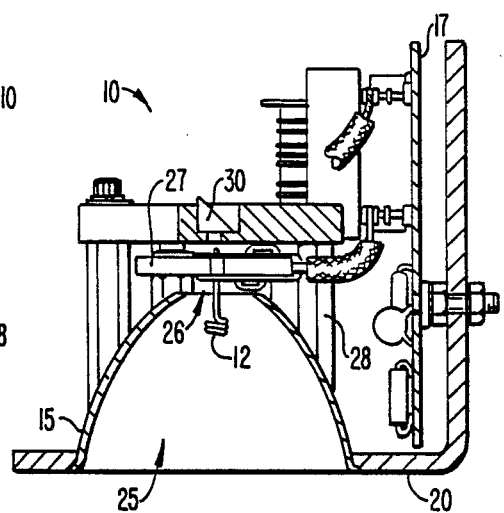
FIG._1B.
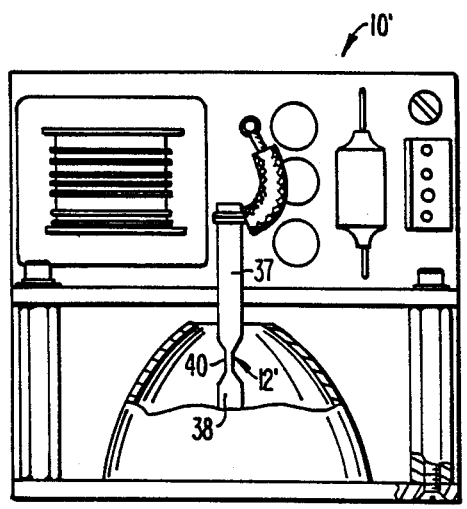
FIG._2A.
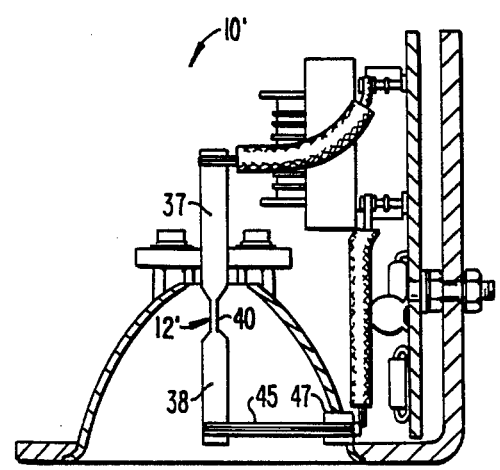
FIG._2B.

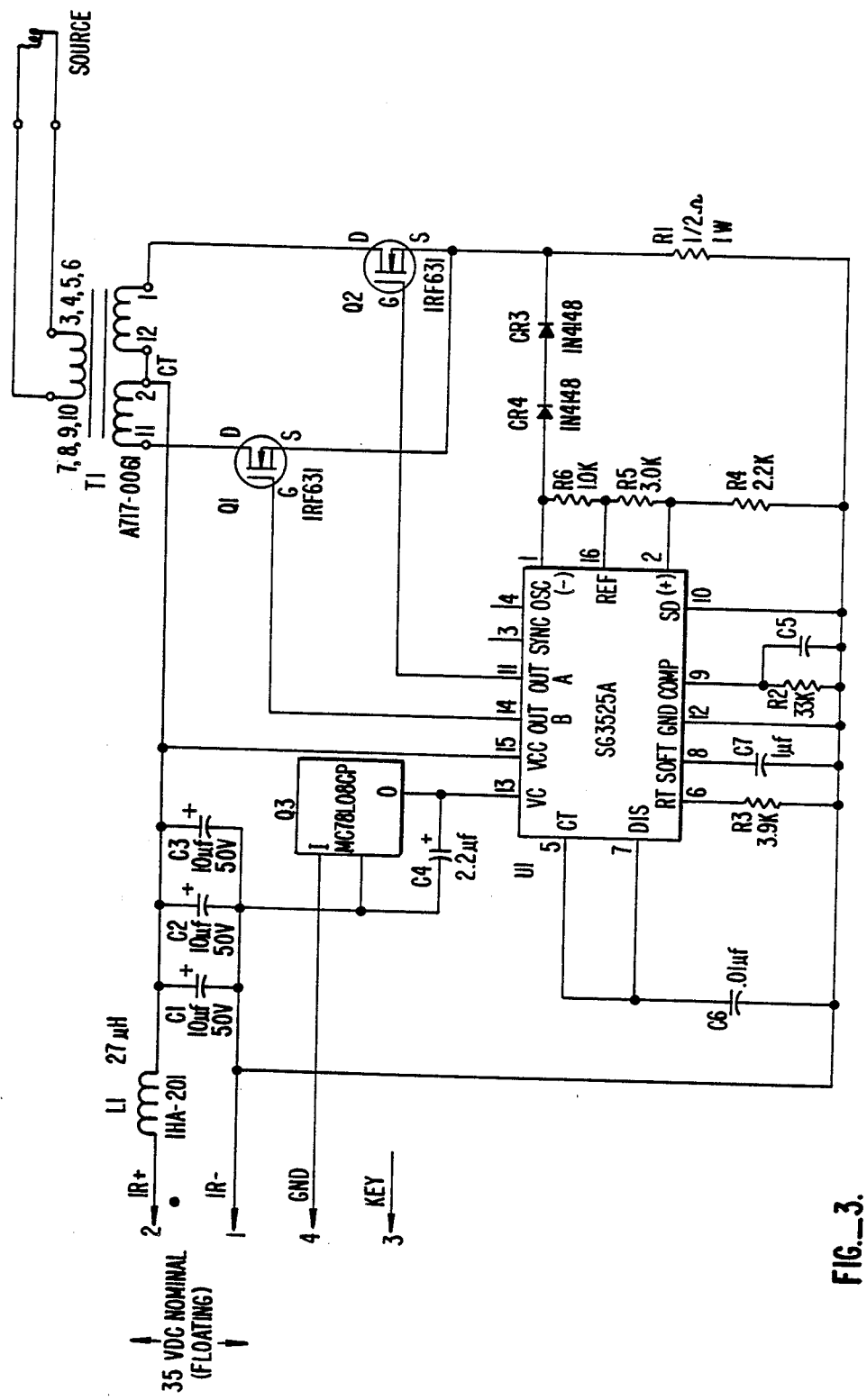
FIG._3.

4,935,633

LOW POWER INFRARED SOURCE ASSEMBLY FOR SPECTROMETER

FIELD OF THE INVENTION

The present invention relates generally to infrared sources, and more specifically to a low power source for an infrared spectrometer.

BACKGROUND OF THE INVENTION

Infrared spectrometers typically utilize an infrared source that comprises either a ceramic element or a metallic filament. Such sources normally dissipate on the order of 100 watts, which necessitates some sort of water cooling. A ceramic element operates the temperature of approximately 1150° C. while the filament type source operates at approximately 950° C.

While the prior art infrared sources tend to operate satisfactorily, the need for water cooling represents added complication and expense. Moreover, filament type sources are often characterized by a short life.

SUMMARY OF THE INVENTION

The present invention provides an infrared source assembly that operates at about 1150° C. without the need for water cooling.

In broad terms, the source assembly has a radiating element configured with a small surface area, energized by a high frequency alternating voltage, preferably an AC square wave. The frequency of the applied voltage is much greater than the inverse of the radiating element's thermal time constant so that the temperature is very stable. The radiating element is preferably mounted relative to a concave reflector so that the radiation forms a beam suitable for input to a spectrometer. In a first embodiment, the radiating element is in the form of a coil, while in a second embodiment, it is in the form of a cylinder having a central portion of reduced diameter.

The use of a radiating element having a small surface area allows operation at 1150° C. without requiring high power. Providing low power to such a small element requires that the electrical drive source be at low voltage with virtually no ripple. Driving the radiating element with an AC square wave obviates the need for a very large capacitor and provides high efficiency operation since there is no need for diodes, as would be the case with a DC supply.

A further understanding of the nature and advantages of the present invention may be realized by reference to the remaining portion of this specification and the attached drawings.

BRIEF DESCRIPTION OF THE DRAWINGS

FIGS. 1A and 1B are front and side elevational views, partly cutaway, of a first embodiment of the source assembly of the present invention; and FIGS. 2A and 2B are front and side elevational views, partly cutaway, of a second embodiment of the source assembly of the present invention; and FIG. 3 is a circuit schematic of the drive circuitry for the source.

DESCRIPTION OF THE PREFERRED EMBODIMENT

FIGS. 1A and 1B are front and side elevational views of a source assembly 10 according to a first embodiment of the present invention. Source assembly 10 includes a radiating element 12, a concave reflector 15 registered to the radiating element, and driver circuitry (mounted to a main circuit board 17) connected to the radiating element. In operation the driver circuitry causes current flow through the radiating element, and the reflector directs the infrared radiation emitted by the element into the input port of a spectrometer. While the source was originally designed for a Fourier Transform spectrometer, it would also be suitable for a dispersive instrument.

The components of source assembly 10 are mounted to a frame 20 which takes the form of a simple angle bracket, one side of which is formed with an aperture 25 sized to accommodate reflector 15. Reflector 15 is preferably a paraboloid of revolution and is precisely registered to frame 20 with its axis perpendicular to the face of the frame. Reflector 15 is formed with an aperture 26 on its axis sized to allow mounting the radiating element to a mounting board 27 above the reflector. Mounting board 27 is formed of a refractory material such as lava or ceramic, and is mounted to the frame by standoffs 28. A 45° prism reflector 30 is mounted to the frame so as to direct a laser beam (for the spectrometer's monochromatic fringe reference system) along the axis of the reflector.

Radiating element 12 is a relatively short thick wire (0.5 mm diameter, 10–15 mm length) preferably a nichrome type alloy (such as sold under the trade name Kanthal). The wire has its ends welded to terminals on mounting board 27 which are themselves connected to terminals on main circuit board 17. The wire is wound in the form of a small diameter coil coaxial with the axis of reflector 15 and axially located in the immediate vicinity of the focus of the paraboloid.

FIGS. 2A and 2B are front and side elevational views of a source assembly 10' according to a second embodiment of the present invention. Reference numerals of elements corresponding to those of FIGS. 1A and 1B will be used where appropriate. Primed reference numerals will be used to denote modified elements that otherwise correspond in function.

Source assembly 10' includes a radiating element 12' which is in the form of a cylinder having top and bottom portions 37 and 38 of relatively large diameter and a central portion 40 of significantly reduced diameter. The cylindrical element extends vertically with the reduced diameter portion located proximate the focus of the reflector. The mounting and electrical connections of radiating element 12' are somewhat different from those of radiating element 12 of source assembly 10 in that the upper end of the element extends through mounting board 27, which serves only to provide lateral alignment. The top portion is connected to a first terminal on main circuit board 17. The bottom portion of the radiating element is welded to a post conductor 45 which extends horizontally through a feedthrough 47 in reflector 15. The end of post conductor 47 is connected to a second terminal on main circuit board 17. In this embodiment, the radiating element extends along and occupies the reflector axis. Accordingly, there is no prism reflector to direct a laser beam through the filament assembly.

Radiating element 12' can be made of metal, preferably a nichrome type alloy, or ceramic. The cylinder diameter is typically 3–5 mm with the central portion having a length of about 3–8 mm and a diameter of about 0.5–1 mm. The transition between the central portion and the top and bottom portions is preferably frustoconical with a cone half angle of about 30°.

FIG. 3 is a circuit schematic of preferred driver circuitry for the radiating element. A major requirement is that the circuit provide a very well regulated voltage so that the source temperature (and therefore the infrared spectrum of the source) remain substantially constant. It has been found that such a result is possible by applying a high frequency square wave to filament (20-kHz square wave, centered at 0 volts).

A regulated DC voltage is applied to a pulse width modulation controller integrated circuit U1, the switched outputs of which are applied to the respective gates of driver MOSFET's Q1 and Q2, which are connected in a push-pull configuration to an output transformer T1. The output voltage can be tailored by selecting an appropriate turns ratio for the transformer. The frequency of the output waveform is determined by a timing capacitor C6 and a timing resistor R3. The values are chosen to define a frequency that greatly exceeds the inverse of the thermal time constant of the filament. Thus, given that the output amplitude of the circuitry is highly regulated, the temperature of the radiating element is maintained at a closely controlled constant level.

The radiating element of the first embodiment is sized to dissipate on the order of 5–15 watts when energized with a voltage in the range of approximately 0.5–1.5 volts. Under these conditions, the element temperature is about 1150° C. Water cooling is not required since convection is adequate at these low power levels. Convection currents passing through aperture 26 may serve the additional function of carrying away material that evaporates or is otherwise emitted by the hot element. The radiating element of the second embodiment is sized to dissipate about 1–5 watts when energized with a voltage in the range of about 0.05–0.25 volts.

In conclusion, it can be seen that the source assembly of the present invention provides a beam suitable for spectrometer input while dissipating relatively little power. This is made possible by using a radiating element having a small surface area, but unlike traditional thin filaments, the radiation element of the present invention is very rugged and characterized by a long life.

While the above is a complete description of the preferred embodiments of the invention, various modifications, alternative constructions, and equivalents may be used. For example, while the description is in terms of a source assembly having a paraboloidal reflector with the radiating element in the immediate vicinity of the focus to provide a nearly collimated beam (the finite size of the element actually results in a slightly divergent beam), other rotated conic sections can be used. An ellipsoidal reflector could be used to form an enlarged image of the radiating element at a point a few inches downstream. An aperture placed at this point would limit the apparent element size (and hence divergence of the beam), and a paraboloid could then be used to collimate the beam. Additionally, while an AC square wave is preferred, other alternating forms (such as pure sinusoidal) can be used.

Therefore, the above description and illustrations should not be taken as limiting the scope of the invention which is defined in the appended claims.

We claim:

1. A radiation source assembly for a spectrometer comprising:

a radiating element characterized by a thermal time constant for an operating temperature of about 1150° C.; and electrical drive means for applying an AC square wave voltage across said radiating element at a frequency much greater than the inverse of said thermal time constant of said radiating element;

said radiating element being sized and said electrical drive means providing a voltage to heat at least a portion of said radiating element to a temperature of about 1150° C.

2. The source assembly of claim 1 and further comprising:

a concave reflector; and means for mounting said radiating element relative to said reflector so that radiation emitted from said radiating element forms a directed beam.

3. The source assembly of claim 2 wherein said reflector is in the form of a portion of the surface of a rotated conic section characterized by a focus, and wherein said radiating element is located proximate said focus in order to provide a generally collimated beam.

4. The source assembly of claim 1 wherein said electrical drive means operates to provide a waveform having an amplitude of 0.5–1.5 volts and wherein said radiating element is sized to dissipate 5–15 watts upon energization by said electrical drive means.

5. The source assembly of claim 1 wherein said electrical drive means operates to provide a waveform having an amplitude of 0.05–0.25 volts, and wherein said radiating element is sized to dissipate 1–5 watts upon energization by said electrical drive means.

6. The source assembly of claim 1 wherein said radiating element is in the form of a high-temperature alloy wire having a diameter of approximately 0.5 mm and a length of approximately 10–15 mm.

7. The source assembly of claim 6 wherein said wire is wound in the form of a coil.

8. The source assembly of claim 1 wherein said radiating element is in the form of a cylinder having a central portion of reduced diameter.

9. The source assembly of claim 8 wherein said cylinder has a diameter on the order of 3–5 mm and said central portion has a length of about 3–8 mm and a diameter of about 0.5–1 mm.

10. A radiation source assembly for a spectrometer comprising:

a relatively short thick high-temperature alloy wire in the form of a small coil characterized by a thermal time constant for a desired operating temperature;

a concave reflector;

means for mounting said coil relative to said reflector so that radiation emitted from said coil forms a beam suitable for input to the spectrometer; and electrical drive means for applying an AC square wave voltage having an amplitude of 0.5–1.5 volts across said coil at a frequency much greater than the inverse of said thermal time constant of said coil.

11. The source assembly of claim 10 wherein said coil is sized to dissipate 5–15 watts upon energization by said electrical drive means.

12. The source assembly of claim 10 wherein said reflector is in the form of a paraboloid of revolution characterized by a focus, and wherein said coil is located proximate said focus in order to provide a generally collimated beam.

13. A radiation source assembly for a spectrometer comprising:
   a radiating element in the form of a cylinder having a central portion of reduced diameter characterized by a thermal constant for a desired operating temperature;
   a concave reflector;
   means for mounting said central portion relative to said reflector so that radiation emitted from said central portion forms a beam suitable for input to the spectrometer; and
   electrical drive means for applying an AC square wave voltage having an amplitude of 0.05-0.15 volts across said radiating element at a frequency much greater than the inverse said thermal time constant of said radiating element.

14. The source assembly of claim 13 wherein said central portion is sized to dissipate 1-5 watts upon energization by said electrical drive means.

15. The source of claim 13 wherein said cylinder is a high-temperature alloy.

16. The source of claim 13 wherein said cylinder is ceramic.

* * * * *